J. B. STAMOUR.
Loom Temple.

No. 233,043. Patented Oct. 5, 1880.

Witnesses: Henry Howson, Jr.
Harry Smith.

Inventor:
John B. Stamour,
by his Attorneys,
Howson & Son

UNITED STATES PATENT OFFICE.

JOHN B. STAMOUR, OF PHILADELPHIA, PENNSYLVANIA, ASSIGNOR OF ONE-HALF OF HIS RIGHT TO THOMAS CUNNINGHAM, HORATIO B. LINCOLN, GEORGE BROWN, LUCIAN BROWN, FRANK P. PENDLETON, AND HERMAN E. CUNNINGHAM.

LOOM-TEMPLE.

SPECIFICATION forming part of Letters Patent No. 233,043, dated October 5, 1880.

Application filed October 10, 1879.

*To all whom it may concern:*

Be it known that I, JOHN B. STAMOUR, of Philadelphia, Pennsylvania, have invented a new and useful Improvement in Loom-Temples, of which the following is a specification.

My improvements in loom-temples relate, first, to devices for connecting the temple to the breast-beam of the loom, the object of this part of my invention being to afford facilities for the ready vertical and lateral adjustment of the temple, and for insuring the stability of the temple-carrier after adjustment.

The second object of my invention is to so combine the hinged roller-carrier and the roller-shield with a turn-buckle that the shocks to which the temple is subject cannot easily loosen the carrier; and the third feature of my invention relates to that part of the temple which is struck by the lathe in beating up the weft, the object being to make this part of the temple adjustable and secure after adjustment.

Figure 1:
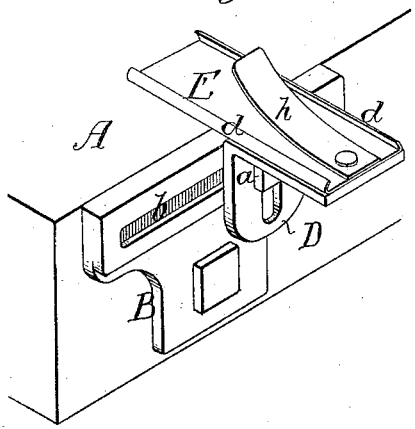
Figure 2:
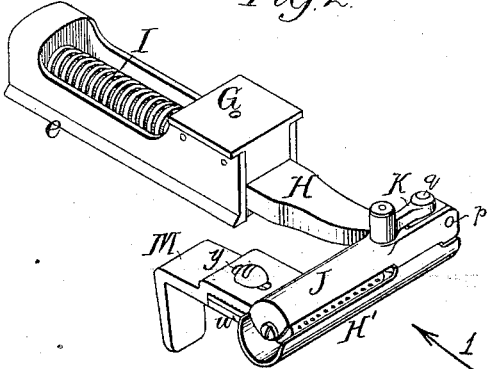
Figure 3:
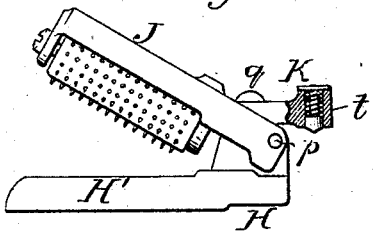
Figure 4:
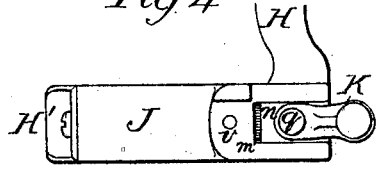
Figure 5:
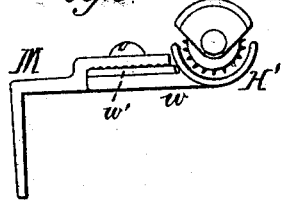
Figure 6:
Figure 7:
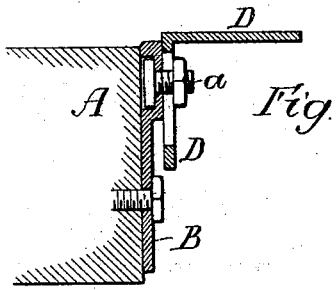
Figure 8:
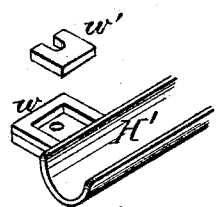

In the accompanying drawings, Figure 1 is a perspective view of part of my improved temple; Fig. 2, a perspective view of another part of the same; Fig. 3, a front view of the roller-carrier; Fig. 4, a plan view of the same; Fig. 5, an end view of the roller-carrier; Fig. 6, a longitudinal section of the box which carries the temple-bar; Fig. 7, a vertical section of part of Fig. 1, and Fig. 8 a perspective view illustrating one of the features of my invention.

To the inner side of the breast-beam A of the loom is firmly bolted a plate, B. The vertical portion of a bracket, D, is secured to the plate B by a bolt, a, which passes through a horizontal slot, b, in the said plate, and through a vertical slot in the bracket, as shown in Fig. 7, so that the bracket can be adjusted both laterally and vertically without disturbing the plate B. The slot b is enlarged on the inner side for the reception of the head of the bolt a, thereby obviating the necessity of grooving the inner face of the breast-beam.

The bolt a serves to secure the bracket D directly to the face of the plate B, which face is close to the breast-beam A, so that greater stability in the support of the bracket is insured than can be attained if the said bracket is bolted to a horizontal flange on the plate, as has been proposed.

To the top of the horizontal portion of the bracket D is secured a plate, E, which overlaps the breast-beam and is edged with undercut or bent flanges d d, and to these flanges are adapted ribs e e on the box G, so that the latter can slide longitudinally on the bracket under the circumstances explained hereinafter, but can have no other movement independently of the said bracket. These flanges may, if desired, form a part of the bracket, but in any case the fit should be so tight that there will be friction enough to prevent the easy movement of the box, this friction being governed by a spring, h, secured to the bracket and bearing against the under side of the box, and the retarding influence of the spring may be increased by corrugating the under side of the box transversely, as shown in Fig. 6.

Instead of the spring h a pad of rubber, leather, or other elastic or semi-elastic material may be fitted into the bracket D and compressed by the box G, so as to exert a yielding pressure on the latter; or the spring may be arranged at one side of the box instead of on the bottom of the same.

The temple-arm H is arranged to slide in the box G, which contains the usual spring I, tending to force the arm outward. At the end of the arm, and forming part of the same, is the roller-shield H', to a projection on which is hinged the roller-carrier J, as shown in Fig. 3, so that both carrier and roller may be turned upward—an arrangement described and claimed in the Letters Patent No. 212,280, granted to my assignees February 11, 1879.

Difficulty was experienced in retaining the temple-carrier in a depressed position by the devices shown in the said patent, the repeated shocks to which all temples are subjected tending to loosen the catch.

In my present improvement the carrier is slotted at m for receiving the projection n on the shield H', the pivot-pin p passing through the projection and carrier.

A turn-buckle, K, is pivoted to the projection n at q, and the arm of this turn-buckle is a trifle less in width than the slot in the roller-carrier, so that before the latter can be turned up the arm must be in exact line with the slot, as shown in Fig. 4. When turned to the position shown in Fig. 2, however, the carrier will be locked, and even if it leaves this position and occupies any position other than that shown in Fig. 4 the carrier will continue to be retained; hence there is little likelihood of the accidental unlocking of the carrier, for the movement of the turn-buckle by shocks and jars to a position exactly in line with the slot of the carrier would necessarily be a very rare occurrence.

In order that the turn-buckle may be retained in the position Fig. 2, however, it is provided with a spring-bolt, t, the end of which can enter a depression, v, in the top of the carrier, the pin being rounded at the end, so that the turn-buckle can be moved from the position, Fig. 2, by a slight effort.

From one end of the shield H' projects a lug, w, which is recessed on the top for the reception of a friction-pad, w', of leather or equivalent material, the leather being thicker than the recess is deep; and to this lug is secured the horizontal portion of the bracket M, the vertical portion of which is for a projection on the lathe to strike against, as in other temples. It is important that this bracket should be adjustable; hence the screw which secures it to the lug passes through an elongated slot, y, in the horizontal portion of the bracket.

The leather interposed between the lug and the bracket has such an adhesive affinity for the metal that, when compressed by the tightening of the screw, there is very little chance of any movement of the bracket independently of the temple-shield and temple-arm.

In order to increase the hold of the pad w' on the horizontal portion of the bracket M, the latter may be roughened or serrated on the under side.

In order to insure the proper retention of the bracket M, the pad w' must be incapable of movement on the lug w; hence the said pad is fitted to the recess or socket in the said lug.

Under the ordinary circumstances the temple-arm H will reciprocate in the box G under control of the spring I, the box being held in position by the tension of the spring h; but in the event of an undue movement of the arm H, such as would be caused by the shuttle coming into contact with the outer end of the same, the tension of the spring h will be overcome, and the box G will be moved in its guides on the portion E of the bracket D, thus preventing the breakage of any of the parts of the temple.

I claim as my invention—

1. The combination of the plate B, adapted to be bolted to the inner side of the breast-beam of a loom, and having a horizontal slot, b, with the temple-supporting bracket D, having a vertical slot, and with the bolt a, adapted to both slots, and having a nut, whereby the bracket D is clamped directly to the face of the plate B and its stability thereby insured without detracting from ease of adjustment, all substantially as specified.

2. The combination of the plate B, adapted to be bolted to the inner side of the breast-beam of a loom, and having a horizontal slot, b, enlarged on the inner side, with the temple-supporting bracket D, having a vertical slot, and with the bolt a, adapted to both slots, having a head fitting in the enlarged portion of the slot b and a nut for confining the bracket, all substantially as set forth.

3. The combination of the temple-arm H, having a shield, H', and projection n, a roller-carrier arranged at right angles to the arm and having a slot for the reception of the projection n, to which said carrier is pivoted, and a turn-buckle hung to the projection n, proportioned in width in respect to the slot of the roller-carrier as set forth, and provided with a spring-bolt, t, as specified.

4. The combination of the temple-arm H, having a shield, H', with socketed lug w, the bracket M, having a slotted portion overlapping the lug w, the confining screw or bolt, and the friction-pad w', fitted to the socket of the lug w and clamped between said lug and the overhanging portion of the bracket M, all substantially as set forth.

In testimony whereof I have signed my name to this specification in the presence of two subscribing witnesses.

JOHN B. STAMOUR.

Witnesses:
 ALEXANDER PATTERSON,
 HARRY SMITH.